(12) United States Patent
Bilge et al.

(10) Patent No.: US 10,944,781 B1
(45) Date of Patent: Mar. 9, 2021

(54) SYSTEMS AND METHODS FOR IDENTIFYING MALICIOUS DOMAIN NAMES FROM A PASSIVE DOMAIN NAME SYSTEM SERVER LOG

(71) Applicant: Symantec Corporation, Mountain View, CA (US)

(72) Inventors: Leyla Bilge, Antibes (FR); Pierre-Antoine Vervier, Cagnes-sur-Mer (FR)

(73) Assignee: NortonLifeLock Inc., Tempe, AZ (US)

( * ) Notice: Subject to any disclaimer, the term of this patent is extended or adjusted under 35 U.S.C. 154(b) by 197 days.

(21) Appl. No.: 16/018,041

(22) Filed: Jun. 25, 2018

(51) Int. Cl.
*H04L 29/06* (2006.01)
*G06F 17/18* (2006.01)
*H04L 29/12* (2006.01)

(52) U.S. Cl.
CPC .......... *H04L 63/1441* (2013.01); *G06F 17/18* (2013.01); *H04L 61/1511* (2013.01); *H04L 61/2061* (2013.01); *H04L 63/1425* (2013.01)

(58) Field of Classification Search
CPC ............. H04L 63/1441; H04L 61/2061; H04L 61/1511; H04L 63/1425; G06F 17/18
USPC .......................................................... 726/22
See application file for complete search history.

(56) References Cited

U.S. PATENT DOCUMENTS

| | | | | |
|---|---|---|---|---|
| 9,178,901 B2 * | 11/2015 | Xue | ..................... | H04L 63/1425 |
| 10,178,121 B2 * | 1/2019 | Klatt | .................... | H04L 63/1433 |
| 2014/0007238 A1 * | 1/2014 | Magee | ................ | H04L 63/1408 726/24 |
| 2017/0041332 A1 * | 2/2017 | Mahjoub | ............. | H04L 43/0876 |
| 2018/0034827 A1 * | 2/2018 | Kaliski, Jr. | ........... | H04L 63/126 |
| 2018/0176241 A1 * | 6/2018 | Manadhata | ......... | G06F 16/2477 |
| 2019/0007455 A1 * | 1/2019 | Sheng | ................ | H04L 63/1416 |

OTHER PUBLICATIONS

Hu et al., "Identifying malicious web domains using machine learning techniques with online credibility and performance data", doi: 10.1109/CEC.2016.7748347, 2016, pp. 5186-5194. (Year: 2016).*

(Continued)

*Primary Examiner* — Peter C Shaw
(74) *Attorney, Agent, or Firm* — FisherBroyles, LLP

(57) ABSTRACT

Disclosed computer-implemented methods for identifying malicious domain names from a passive domain name system server log (DNS log) may include, in some examples, (1) creating a pool of domain names from the DNS log, (2) identifying respective features of each name in the pool, (3) preparing a list of known benign names and respective features of each known benign name, (4) preparing a list of known malicious names and features of each known malicious name, (5) computing a classification model based on (A) the features of each benign name on the list of benign names and (B) the features of each malicious name on the list of malicious names, (6) identifying respective features of an unclassified domain name, and (7) classifying, using the classification model, the unclassified domain name as malicious, based on the respective features of the unclassified domain name. Various other methods, systems, and computer-readable media are also disclosed.

17 Claims, 6 Drawing Sheets

(56) References Cited

OTHER PUBLICATIONS

Chakraborty et al., "A URL address aware classification of malicious websites for online security during web-surfing", doi: 10.1109/ANTS.2017.8384155, 2017, pp. 1-6. (Year: 2017).*

Leyla Bilge, Sevil Sen, Davide Balzarotti, Engin Kirda, Christopher Kruegel; "EXPOSURE: a Passive DNS Analysis Service to Detect and Report Malicious Domains"; Journal ACM Transactions on Information and System Security (TISSEC), vol. 16 Issue 4, Apr. 2014, Article No. 14, ACM New York, NY, USA, doi>10.1145/2584679 (Apr. 2014).

* cited by examiner

SYSTEMS AND METHODS FOR IDENTIFYING MALICIOUS DOMAIN NAMES FROM A PASSIVE DOMAIN NAME SYSTEM SERVER LOG

BACKGROUND

The domain name system (DNS) plays a crucial role for the internet to work properly. Both malicious entities and benign services rely on DNS servers to translate domain names to internet protocol (IP) addresses. In particular, malicious entities abuse DNS servers to design robust, flexible, and reliable infrastructures to carry out malicious activities. As attacks and malware have become more complex and sophisticated, it has become very difficult to detect attacks and malware using classic dynamic and static analyses. Moreover, attackers are also making malware more agile by frequently changing domain names used by the malware to access malicious servers and/or infected machines, thus making identification of malicious communications through network-based detection devices more difficult. The instant disclosure, therefore, identifies and addresses a need for systems and methods for identifying malicious domain names from a passive domain name system server log.

SUMMARY

As will be described in greater detail below, the instant disclosure describes various systems and methods for identifying malicious domain names from a passive domain name system server log.

In some examples, a method for identifying malicious domain names from a passive domain name system server log may include (1) creating, at a computing device, a pool of domain names at least in part from the passive domain name server log, (2) identifying respective features of each domain name in the pool of domain names, (3) preparing a list of known benign domain names and the respective features of each known benign domain name on the list of known benign domain names, wherein the known benign domain names are in the pool of domain names, (4) preparing a list of known malicious domain names and the respective features of each known malicious domain name on the list of known malicious domain names, wherein the known malicious domain names are in the pool of domain names, (5) computing a classification model based at least in part on (A) the respective features of each known benign domain name on the list of known benign domain names, and (B) the respective features of each known malicious domain name on the list of known malicious domain names, (6) identifying respective features of an unclassified domain name, and (7) classifying, using the classification model, the unclassified domain name as a malicious domain name, based on the respective features of the unclassified domain name.

In some examples, each domain name in the pool of domain names may be a fully-qualified domain name. In some embodiments, at least one of the respective features of each domain name in the pool of domain names may describe a domain name server query access pattern of a user.

In an example, the method may further include adding the malicious domain name to the list of known malicious domain names. In an embodiment, the method may further include sending the list of known malicious domain names to a malware detection system.

In some examples, identifying respective features of each domain name in the pool of domain names may further include at least one of (1) identifying a number of days since the domain name was initially present in the passive domain name server log, (2) identifying a number of days since the domain name was recently present in the passive domain name server log, and/or (3) identifying an age of the domain name.

In an embodiment, identifying respective features of each domain name in the pool of domain names may further include at least one of (1) identifying a total number of queries for the domain name, (2) identifying a standard deviation of the total number of queries for the domain name, (3) identifying an average number of queries per day for the domain name, and/or (4) identifying a standard deviation of the average number of queries per day for the domain name.

In some embodiments, identifying respective features of each domain name in the pool of domain names may further include at least one of (1) identifying a score describing the domain name is automatically generated and/or (2) identifying a number of fully-qualified domain names of a main domain associated with the domain name.

In some examples, identifying respective features of each domain name in the pool of domain names may further include at least one of (1) identifying a total number of internet protocol (IP) addresses mapped to the domain name, (2) identifying an average number of IP addresses mapped to the domain name per day, (3) identifying a rate at which new IP addresses are mapped to the domain name, (4) identifying a rate at which new countries are associated with the domain name, (5) identifying a rate at which new IP prefixes are mapped to the domain name, (6) identifying a rate at which new organizations are associated with the domain name, (7) identifying an average lifetime of IP addresses mapped to the domain name, (8) identifying a total number of countries associated with IP addresses mapped to the domain name, (9) identifying a most recent time a new country was associated with IP addresses mapped to the domain name, (10) identifying a total number of IP prefixes to which IP addresses mapped to the domain name belong, (11) identifying a total number of organizations to which IP addresses mapped to the domain name belong, (12) identifying a ratio of IP addresses mapped to the domain name that are benign versus IP addresses mapped to the domain name that are known to have a connection to a malicious entity, and/or (13) identifying a number of other domain names that share an IP address with the domain name.

In some embodiments, identifying respective features of each domain name in the pool of domain names may further include at least one of (1) identifying a total number of internet protocol addresses that query the domain name, (2) identifying an average number of clients of the domain name per day, (3) identifying an average number of clients of the domain name per month, (4) identifying a rate at which new clients of the domain name query the domain name, (5) identifying a rate at which new countries, to which querying clients of the domain name belong, are present, and/or (6) identifying a rate at which new IP prefixes are present for clients querying the domain name.

In an embodiment, identifying respective features of each domain name in the pool of domain names may further include at least one of (1) identifying a number of distinct canonical names associated with the domain name, (2) identifying a rate at which new canonical names associated with the domain name are added, and/or (3) identifying an average age of canonical names associated with the domain name.

In some examples, identifying respective features of each domain name in the pool of domain names may further include at least one of (1) identifying a total number of name servers serving the domain name, (2) identifying a rate at which new name servers serving the domain name are added, and/or (3) identifying an average age of a name server serving the domain name.

In an example, the identifying respective features of each domain name in the pool of domain names may further include at least one of (1) identifying a number of other domain names registered by an entity that registered the domain name and/or (2) identifying a number of other domain names registered at the same time as the domain name.

In some embodiments, the method may further include performing a security action in response to classifying the unclassified domain name as a malicious domain name. In some examples, the security action may further include blocking access to a device associated with the malicious domain name.

In one embodiment, a system for identifying malicious domain names from a passive domain name system server log may include at least one physical processor and physical memory that includes computer-executable instructions that, when executed by the physical processor, cause the physical processor to (1) create, at a computing device, a pool of domain names at least in part from the passive domain name server log, (2) identify respective features of each domain name in the pool of domain names, (3) prepare a list of known benign domain names and the respective features of each known benign domain name on the list of known benign domain names, wherein the known benign domain names are in the pool of domain names, (4) prepare a list of known malicious domain names and the respective features of each known malicious domain name on the list of known malicious domain names, wherein the known malicious domain names are in the pool of domain names, (5) compute a classification model based at least in part on (A) the respective features of each known benign domain name on the list of known benign domain names, and (B) the respective features of each known malicious domain name on the list of known malicious domain names, (6) identify respective features of an unclassified domain name, and (7) classify, using the classification model, the unclassified domain name as a malicious domain name, based on the respective features of the unclassified domain name.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) create, at a computing device, a pool of domain names at least in part from the passive domain name server log, (2) identify respective features of each domain name in the pool of domain names, (3) prepare a list of known benign domain names and the respective features of each known benign domain name on the list of known benign domain names, wherein the known benign domain names are in the pool of domain names, (4) prepare a list of known malicious domain names and the respective features of each known malicious domain name on the list of known malicious domain names, wherein the known malicious domain names are in the pool of domain names, (5) compute a classification model based at least in part on (A) the respective features of each known benign domain name on the list of known benign domain names, and (B) the respective features of each known malicious domain name on the list of known malicious domain names, (6) identify respective features of an unclassified domain name, and (7) classify, using the classification model, the unclassified domain name as a malicious domain name, based on the respective features of the unclassified domain name.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
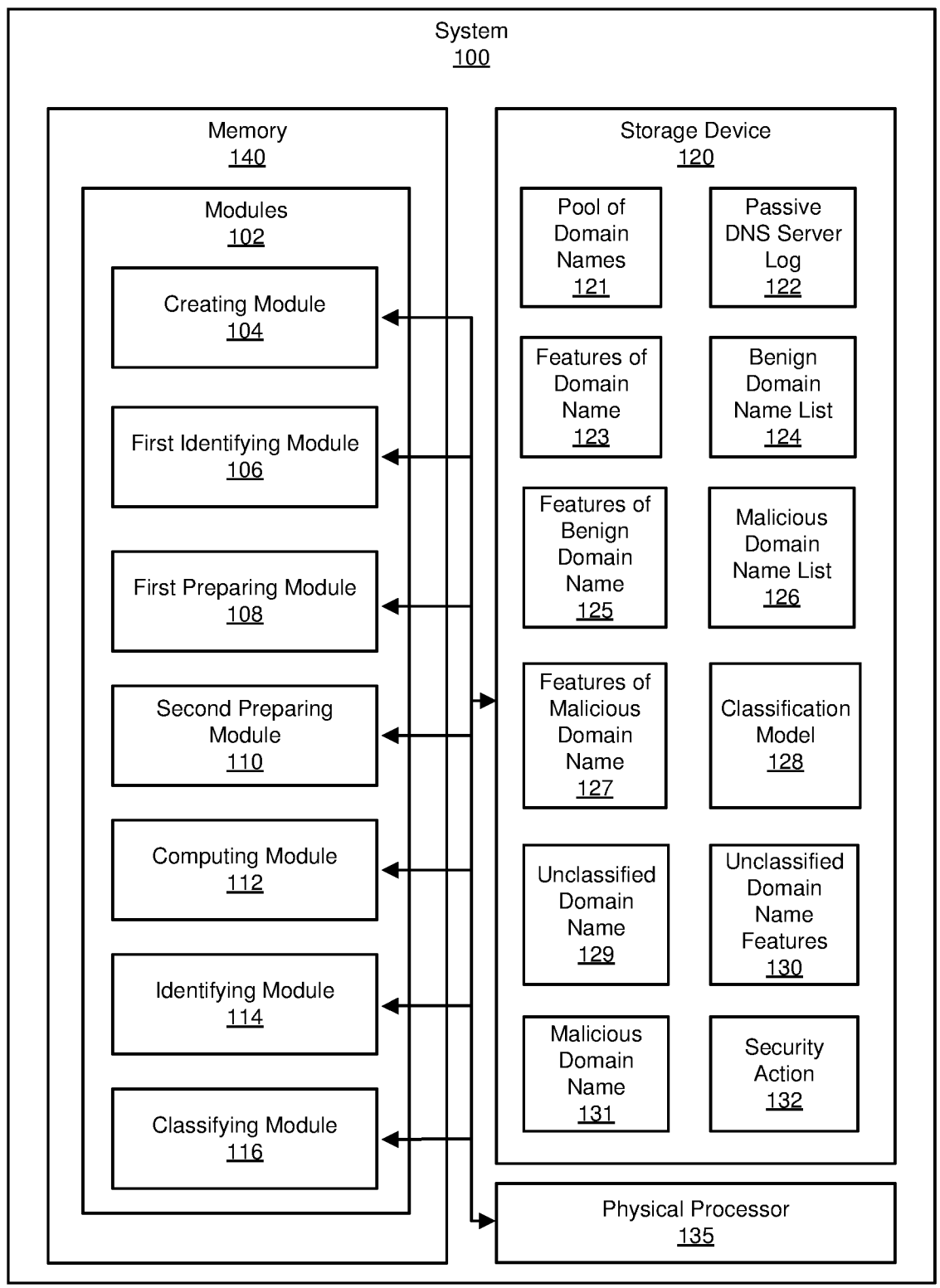
FIG. 1 is a block diagram of an example system for identifying malicious domain names from a passive domain name system server log.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for identifying malicious domain names from a passive domain name system server log. As will be explained in greater detail below, in some examples the systems described herein may enable analyzing features of domain names to identify malicious domain names.

Malicious domain names are often as dependent on domain name system (DNS) services as benign domain names. Use of the DNS system by malware using malicious domains may be leveraged by malware protection services. Clients of a particular command and control (C&C) server exhibit similar access patterns, while clients of a benign server do not exhibit similar access patterns because malware (e.g., bots) share nearly the same (or the same) malicious code and are programmed to act in a similar manner, such as frequently establishing connections with C&C servers. In contrast, clients of benign services exhibit more varied patterns due to vagaries of human action.

In some examples, the provided systems and methods may perform large-scale passive DNS analysis to model access patterns of domain names queried by real users. Analyzing of large numbers (e.g., millions) of known benign and known malicious domain names and their DNS query behavior indicates that there are features of domain names that distinguish malicious domain names from benign domain names due to behavioral differences. Thus, malicious domain names may be automatically identified from their distinguishing features.

In non-limiting examples, features of domain names that distinguish malicious domain names from benign domain names may include ages of domain names, ages of fully-qualified domain names (FQDN), numbers of countries from which clients are querying, numbers of FQDNs main domain names have, average IP usage time, average canonical name (CNAME) usage time, last new client seen times, DELA scores, 95th percentile for numbers of other domains that share IP addresses mapped to the domains, last new client prefixes seen, and/or last new organization seen.

In some examples, the provided methods and apparatuses may identify domain names that are used by attackers. The domain names that are used by attackers may be identified in advance of attacks and/or before attackers stop using the domain names. In some examples, the provided techniques may be performed multiple times (e.g., hourly, daily) to identify new malicious domain names.

By doing so, the systems and methods described herein may improve functioning of a computing device and/or provide targeted protection against malware, and thus improve fields of malware protection in general, by providing a method for automatically identifying malicious domain names. Examples of the provided techniques improve a state of security of target computing devices, potentially resulting in significant time and/or monetary savings. Further, the systems and methods described herein may beneficially provide improvements in speed of detecting malicious domains. In some examples, systems and methods described herein may beneficially provide improvements in speed, sensitivity, and/or accuracy of detecting malicious domain names. Further, systems and methods described herein may beneficially provide malware protection having a lower cost than other techniques. Thus, disclosed systems and methods may provide asset protection for common targets of malware.

Figure 2:
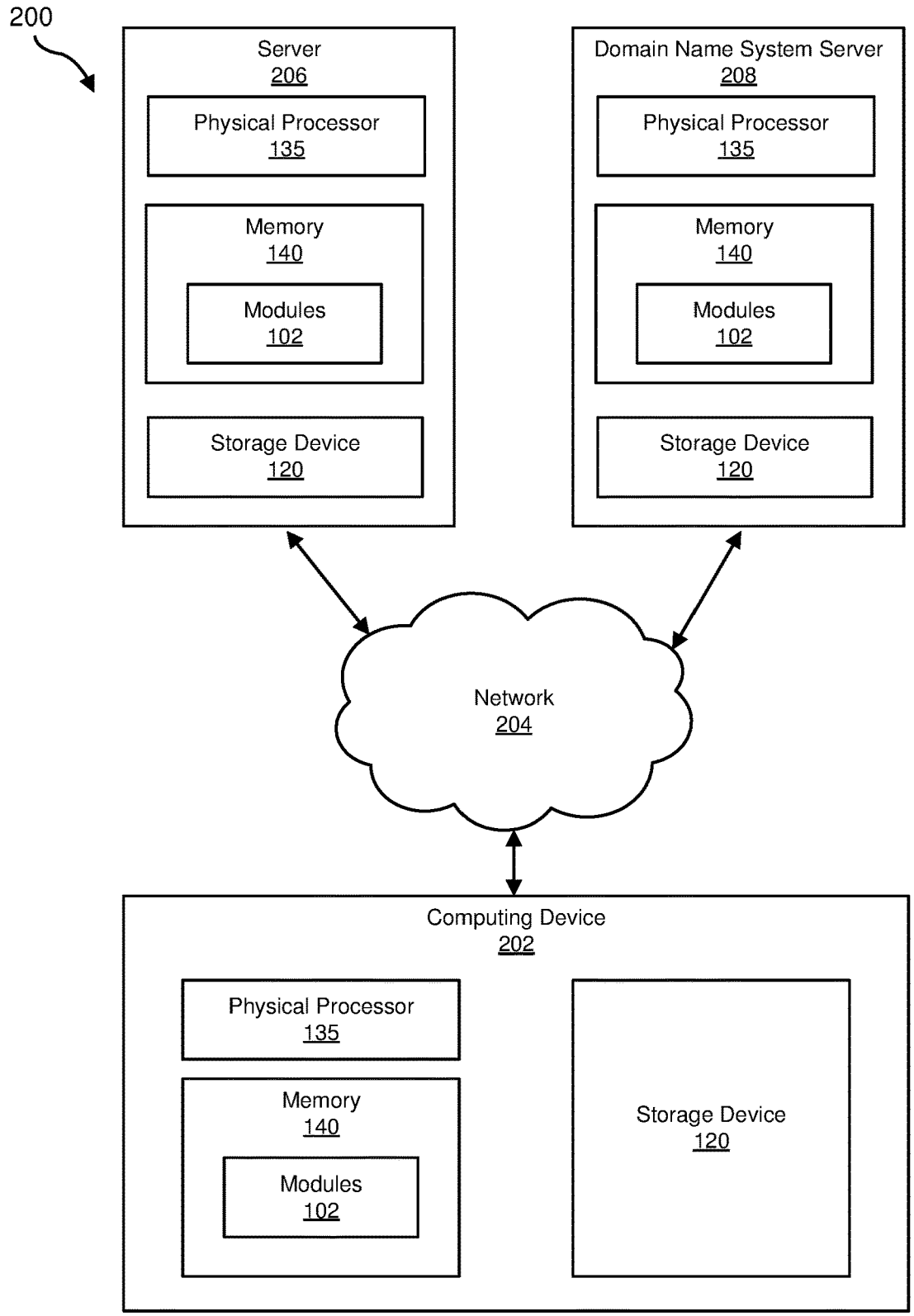
FIG. 2 is a block diagram of an additional example system for identifying malicious domain names from a passive domain name system server log.
Figure 3:
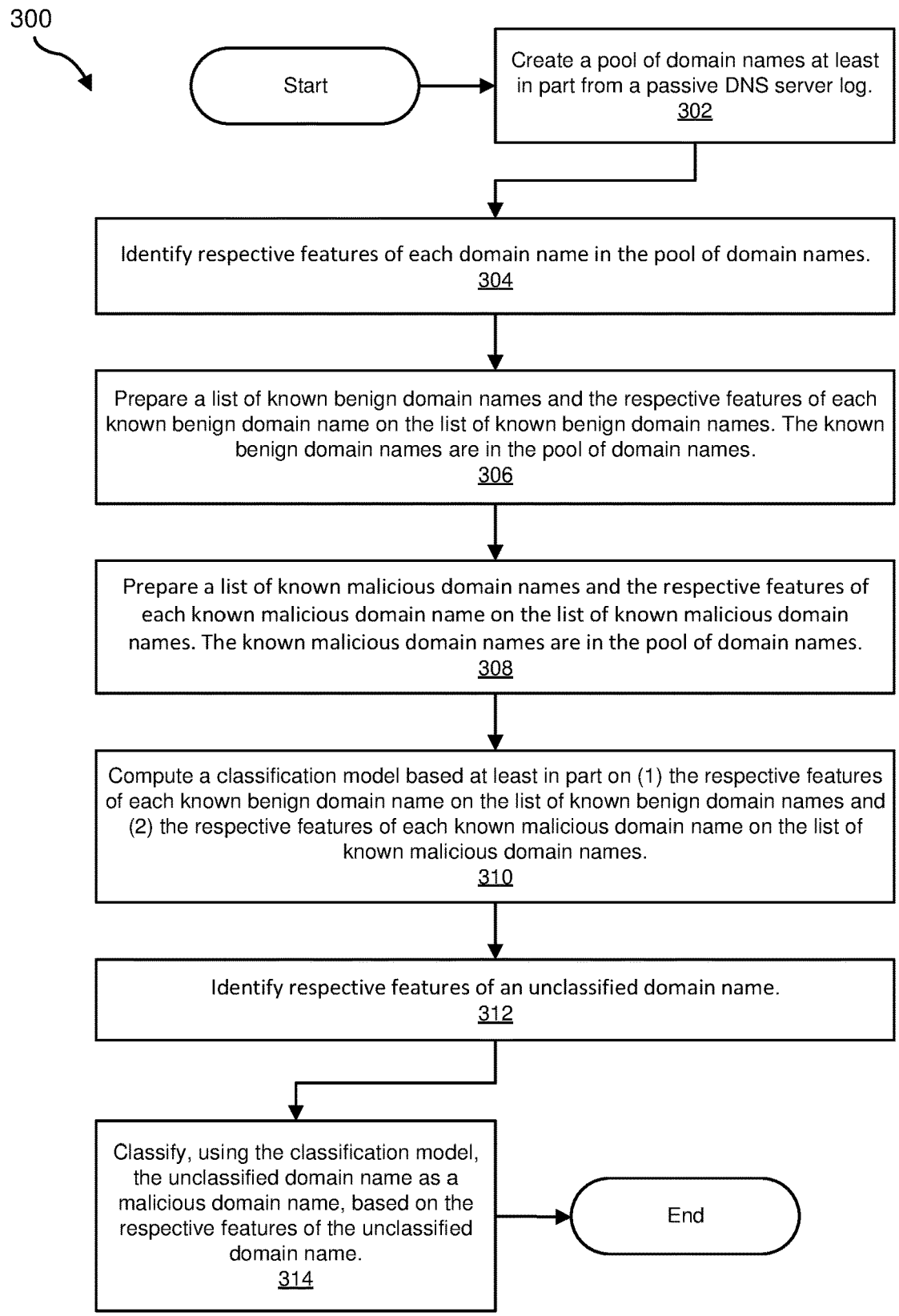
FIG. 3 is a flow diagram of an example method for identifying malicious domain names from a passive domain name system server log.
Figure 4:
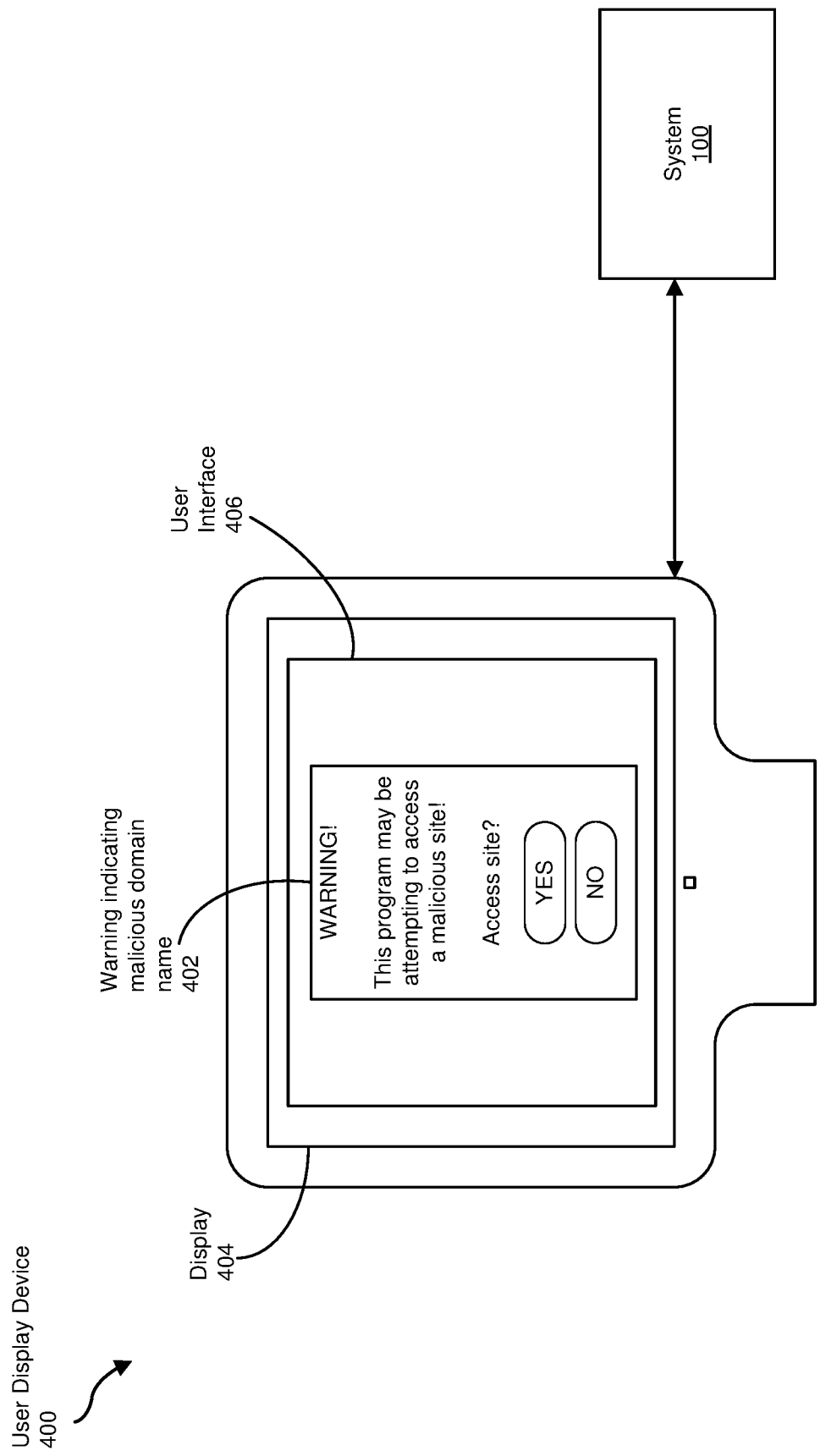
FIG. 4 is a block diagram of an example warning message on a user display device.

The following will provide, with reference to FIGS. 1-2 and 4, detailed descriptions of example systems for identifying malicious domain names from a passive domain name system server log. Detailed descriptions of corresponding computer-implemented methods will also be provided in connection with FIG. 3. In addition, detailed descriptions of an example computing system and network architecture capable of implementing one or more of the embodiments described herein will be provided in connection with FIGS. 5 and 6, respectively.

FIG. 1 is a block diagram of an example system 100 for identifying malicious domain names from a passive domain name system server log. As illustrated in this figure, example system 100 may include one or more modules 102 for performing one or more tasks. As will be explained in greater detail below, modules 102 may include a creating module 104, a first identifying module 106, a first preparing module 108, a second preparing module 110, a computing module 112, an identifying module 114, and/or a classifying module 116. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202, server 206, and/or DNS server 208). One or more of modules 102 in FIG. 1 may also represent all or portions of one or more special-purpose computers configured to perform one or more tasks.

As illustrated in FIG. 1, example system 100 may also include one or more storage devices, such as storage device 120. Storage device 120 generally represents any type or form of volatile or non-volatile storage device or medium capable of storing data and/or computer-readable instructions. In one example, storage device 120 may store, load, and/or maintain information indicating one or more of a pool of domain names 121, a passive domain name system server log 122, respective features of each domain name 123, a list of known benign domain names 124, respective features of each known domain name 125, a list of known malicious domain names 126, respective features of each known malicious domain name 127, a classification model 128, an unclassified domain name 129, respective features of the unclassified domain name 130, and/or a malicious domain name 131. Examples of storage device 120 include, without limitation, Random Access Memory (RAM), Read Only Memory (ROM), flash memory, Hard Disk Drives (HDDs), Solid-State Drives (SSDs), optical disk drives, caches, processor registers, system memory 516 in FIG. 5, variations or combinations of one or more of the same, and/or any other suitable storage memory.

As illustrated in FIG. 1, example system 100 may also include one or more physical processors, such as physical processor 135. Physical processor 135 generally represents any type or form of hardware-implemented processing unit capable of interpreting and/or executing computer-readable instructions. In one example, physical processor 135 may access and/or modify one or more of modules 102 stored in memory 140. Additionally or alternatively, physical processor 135 may execute one or more of modules 102 to facilitate identifying malicious domain names from a passive domain name system server log. Examples of physical processor 135 include, without limitation, microprocessors, microcontrollers, Central Processing Units (CPUs), Field-Programmable Gate Arrays (FPGAs) that implement soft-core processors, Application-Specific Integrated Circuits (ASICs), portions of one or more of the same, variations or combinations of one or more of the same, and/or any other suitable physical processor.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

Example system 100 in FIG. 1 may be implemented in a variety of ways. For example, all or a portion of example system 100 may represent portions of example system 200 in FIG. 2. As shown in FIG. 2, system 200 may include a computing device 202, a server 206 and/or a domain name system server 208 in communication via a network 204. In one example, all or a portion of the functionality of modules 102 may be performed by computing device 202, server 206, DNS server 208, and/or any other suitable computing system. As will be described in greater detail below, one or more of modules 102 from FIG. 1 may, when executed by at least one processor of computing device 202, server 206, and/or DNS server 208, enable computing device 202 server 206, and/or DNS server 208 to identify a malicious domain name from a passive domain name system server log. For example, and as will be described in greater detail below, one or more of modules 102 may cause computing device 202 server 206, and/or DNS server 208 to at least one of 1) create, at system 100, pool of domain names 121 at least in part from passive domain name server log 122, (2) identify respective features of each domain name 123 in pool of domain names 121, (3) prepare list of known benign domain names 124 and a list of respective features of each known benign domain name 125 on list of known benign domain names 124, where known benign domain names are in pool of domain names 121, (4) prepare list of known malicious domain names 126 and a list of respective features of each known malicious domain name 127 on list of known malicious domain names 126, where known malicious domain names are in pool of domain names 121, (5) compute classification model 128 based at least in part on (A) respective features of each known benign domain name 125 on list of known benign domain names 124, and (B) respective features of each known malicious domain name 127 on list of known malicious domain names 126, (6) identify respective features of the unclassified domain name 130 of unclassified domain name 129, and (7) classify, using classification model 128, unclassified domain name 129 as malicious domain name 131, based on respective features of the unclassified domain name 130.

Computing device 202 generally represents any type or form of computing device capable of reading computer-executable instructions. For example, computing device 202 may represent an endpoint device running client-side software, such as anti-malware software. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, Internet-of-Things devices (e.g., smart appliances, etc.), variations or combinations of one or more of the same, and/or any other suitable computing device.

Network 204 generally represents any medium or architecture capable of facilitating communication or data transfer. In one example, network 204 may facilitate communication between computing device 202, server 206, and/or domain name system server 208. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Server 206 generally represents any type or form of computing device that may be capable of reading computer-executable instructions. For example, server 206 may represent a server device running server-side software, such as anti-malware software. Additional examples of server 206 include, without limitation, enterprise servers, gateway servers, security servers, application servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another.

Domain name system server 208 generally represents any type or form of computing device that may be capable of reading computer-executable instructions and translating between domain names and internet protocol addresses. For example, DNS server 208 may represent a server device running server-side software, such as DNS server software. In some examples, DNS server 208 may represent a server device running anti-malware software. Additional examples of DNS server 208 include, without limitation, security servers, application servers, web servers, storage servers, and/or database servers configured to run certain software applications and/or provide various security, web, storage, and/or database services. Although illustrated as a single entity in FIG. 2, DNS server 208 may include and/or represent a plurality of servers that work and/or operate in conjunction with one another. In some examples, DNS server 208 may generate at least a portion of passive DNS server log 122. In some examples, DNS server 208 may send at least a portion of passive DNS server log 122 to computing device 202 and/or server 206 to enable computing device 202 and/or server 206 to perform at least a part of a method described hereby.

FIG. 3 is a flow diagram of an example computer-implemented method 300 for identifying malicious domain names from a passive domain name system server log. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may create pools of domain names at least in part from passive domain name system server logs. The systems described herein may perform step 302 in a variety of ways. For example, creating module 104 may, as part of computing device 202, server 206, and/or DNS server 208 in FIG. 2, create pool of domain names 121 at least in part from passive domain name system server log 122.

In an example, domain names in pools of domain names may be fully-qualified domain names. In some examples, the domain name system server logs may be received from DNS servers such as DNS server 208.

In some embodiments, prior to performing step 304, raw passive DNS log data may be enriched with information from publicly-available third party data sources, IP address blacklists, and/or domain name blacklists to increase a volume of ground truth data and/or to obtain additional information to perform step 304. In some embodiments, available IP address Internet Routing Registry (e.g., whois) data may be parsed to determine registration details, countries, organizations, and IP prefix information for IP addresses. In some examples, IP address and domain data may be collected from multiple data sources and may be updated regularly (e.g., hourly).

As illustrated in FIG. 3, at step 304 one or more of the systems described herein may identify respective features (e.g., identifiable characteristics) of each domain name in the pools of domain names. The systems described herein may perform step 304 in a variety of ways. For example, first identifying module 106 may, as part of computing device 202, server 206, and/or DNS server 208 in FIG. 2, identify respective features of each domain name 123 in pool of domain names 121. In some examples, respective features of each domain name in the pools of domain names may be recalculated incrementally.

In some examples, at least one of the respective features of each domain name in the pools of domain names may describe domain name server query access behavior (e.g., patterns) of users. In an embodiment, malicious DNS detecting may be based on information about machines making DNS requests, such as the IP addresses of machines making DNS requests.

In some examples, identifying respective features of each domain name in the pool of domain names (e.g., identifying respective features of each domain name 123 in pool of domain names 121) may further include identifying domain name age-based features of each domain name in the pool of domain names.

For example, identifying respective features of each domain name in the pool of domain names may include at least one of (1) identifying a number of days since the domain name was initially present in the passive domain name server log, (2) identifying a number of days since the domain name was recently present in the passive domain name server log, and/or (3) identifying an age of the domain name.

In an embodiment, identifying respective features of each domain name in the pool of domain names (e.g., identifying respective features of each domain name 123 in pool of domain names 121) may further include identifying features relating to a volume of queries for domain names over time for each domain name in the pool of domain names.

For example, identifying respective features of each domain name in the pool of domain names may further include at least one of (1) identifying a total number of queries for the domain name, (2) identifying a standard deviation of the total number of queries for the domain name, (3) identifying an average number of queries per day for the domain name, and/or (4) identifying a standard deviation of the average number of queries per day for the domain name.

In some embodiments, identifying respective features of each domain name in the pool of domain names (e.g., identifying respective features of each domain name 123 in pool of domain names 121) may further include identifying features relating to domain name characteristics of each domain name in the pool of domain names.

For example, identifying respective features of each domain name in the pool of domain names may further include at least one of (1) identifying a score (e.g., a DELA score) describing that the domain name is automatically generated and/or (2) identifying a number of fully-qualified domain names of a main domain associated with the domain name.

In some examples, identifying respective features of each domain name in the pool of domain names (e.g., identifying respective features of each domain name 123 in pool of domain names 121) may further include identifying features relating to IP addresses mapped to each domain name in the pool of domain names.

For example, identifying respective features of each domain name in the pool of domain names may further include at least one of (1) identifying a total number of internet protocol addresses mapped to the domain name, (2) identifying an average number of IP addresses mapped to the domain name per day, (3) identifying a rate at which new IP addresses are mapped to the domain name, (4) identifying a rate at which new countries are associated with the domain name, (5) identifying a rate at which new IP prefixes are mapped to the domain name, (6) identifying a rate at which new organizations are associated with the domain name, (7) identifying an average lifetime of IP addresses mapped to the domain name, (8) identifying a total number of countries associated with IP addresses mapped to the domain name, (9) identifying a most recent time a new country was associated with IP addresses mapped to the domain name, (10) identifying a total number of IP prefixes to which IP addresses mapped to the domain name belong, (11) identifying a total number of organizations to which IP addresses mapped to the domain name belong, (12) identifying a ratio of IP addresses mapped to the domain name that are benign versus IP addresses mapped to the domain name that are known to have a connection to a malicious entity, and/or (13) identifying a number of other domain names that share an IP address with the domain name.

In some embodiments, identifying respective features of each domain name in the pool of domain names (e.g., identifying respective features of each domain name 123 in pool of domain names 121) may further include identifying features of client behavior relating to each domain name in the pool of domain names.

For example, identifying respective features of each domain name in the pool of domain names may further include at least one of (1) identifying a total number of internet protocol addresses that query the domain name, (2) identifying an average number of clients of the domain name per day, (3) identifying an average number of clients of the domain name per month, (4) identifying a rate at which new clients of the domain name query the domain name, (5) identifying a rate at which new countries, to which querying clients of the domain name belong, are present, and/or (6) identifying a rate at which new IP prefixes are present for clients querying the domain name.

In an embodiment, identifying respective features of each domain name in the pool of domain names (e.g., identifying respective features of each domain name 123 in pool of domain names 121) may further include identifying canonical name (CNAME)-based features of each domain name in the pool of domain names.

For example, identifying respective features of each domain name in the pool of domain names may further include at least one of (1) identifying a number of distinct canonical names associated with the domain name, (2) identifying a rate at which new canonical names associated with the domain name are added, and/or (3) identifying an average age of canonical names associated with the domain name.

In some examples, identifying respective features of each domain name in the pool of domain names (e.g., identifying respective features of each domain name 123 in pool of domain names 121) may further include identifying name server-based features of each domain name in the pool of domain names.

For example, identifying respective features of each domain name in the pool of domain names may further include at least one of (1) identifying a total number of name servers serving the domain name, (2) identifying a rate at which new name servers serving the domain name are added, and/or (3) identifying an average age of a name server serving the domain name.

In an example, the identifying respective features of each domain name in the pool of domain names (e.g., identifying respective features of each domain name 123 in pool of domain names 121) may further include identifying whois-based features of each domain name in the pool of domain names.

For example, identifying respective features of each domain name in the pool of domain names may further include at least one of (1) identifying a number of other domain names registered by an entity that registered the domain name and/or (2) identifying a number of other domain names registered at the same time as the domain name.

In an example, the identifying respective features of each domain name in the pool of domain names (e.g., identifying respective features of each domain name 123 in pool of domain names 121) may further include identifying time-based features such as age of the domain name, daily similar behavior of the domain name, regular behavior of domain name 123, and/or irregular behavior of the domain name.

In some examples, the identifying respective features of each domain name in the pool of domain names (e.g., identifying respective features of each domain name 123 in pool of domain names 121) may further include identifying DNS answer-based features such as fast-flux features and/or shared IP addresses of domain name 123.

In some embodiments, the identifying respective features of each domain name in the pool of domain names (e.g., identifying respective features of each domain name 123 in pool of domain names 121) may further include identifying time-to-live (TTL) features of domain name 123 such as average TTL of domain name 123, standard TTL of domain name 123, and/or change in TTL of domain name 123.

In some embodiments, the identifying respective features of each domain name in the pool of domain names (e.g., identifying respective features of each domain name 123 in pool of domain names 121) may further include identifying domain-name based features such as if domain name 123 is automatically-generated.

As illustrated in FIG. 3, at step 306 one or more of the systems described herein may prepare lists of known benign domain names and the respective features of each known benign domain name on the lists of known benign domain names. The known benign domain names may be in the pools of domain names. The systems described herein may perform step 306 in a variety of ways. For example, first preparing module 108 may, as part of computing device 202, server 206, and/or DNS server 208 in FIG. 2, prepare list of known benign domain names 124 and respective features of each known benign domain name 125 on list of known benign domain names 124. The known benign domain names may be in the pool of domain names 121.

In an example, the known benign domain names may be selected based on a list of most-visited websites. In some non-limiting examples, lists of known malicious domain names may include information from sources such as the Alexa Top 100K and/or domains that are substantially one year old or older.

As illustrated in FIG. 3, at step 308 one or more of the systems described herein may prepare lists of known malicious domain names and the respective features of each known malicious domain name on the lists of known malicious domain names. The known malicious domain names may be in the pools of domain names. The systems described herein may perform step 308 in a variety of ways. For example, second preparing module 110 may, as part of computing device 202, server 206, and/or DNS server 208 in FIG. 2, prepare list of known malicious domain names 126 and respective features of each known malicious domain name 127 on list of known malicious domain names 126. The known malicious domain names may be in pool of domain names 121.

In an example, the known malicious domain names may be selected based on public domain name lists that have low reliability and/or appear on blacklists. In some non-limiting examples, lists of known malicious domain names may include information from sources such as malwaredomains.com, Zeus Block List, Malware Domain List, Anubis, wepawet, phishtank, and domain lists generated by domain-generating algorithms (DGA) of malware (e.g., Conficker and/or Mebroot).

As illustrated in FIG. 3, at step 310 one or more of the systems described herein may compute classification models based at least in part on (1) the respective features of each known benign domain name on the lists of known benign domain names and (2) the respective features of each known malicious domain name on the lists of known malicious domain names. The systems described herein may perform step 310 in a variety of ways. For example, computing module 112 may, as part of computing device 202, server 206, and/or DNS server 208 in FIG. 2, compute classification model 128 based at least in part on (1) respective features of each known benign domain name 125 on list of known benign domain names 124 and (2) respective features of each known malicious domain name 127 on list of known malicious domain names 126.

In an example, prior to computing classification models, a cross-validation test may be performed to ensure that new classification models do not suffer from fitting problems.

As illustrated in FIG. 3, at step 312 one or more of the systems described herein may identify respective features of unclassified domain names. The systems described herein may perform step 312 in a variety of ways. For example, identifying module 114 may, as part of computing device 202, server 206, and/or DNS server 208 in FIG. 2, identify respective features of an unclassified domain name 130.

As illustrated in FIG. 3, at step 314 one or more of the systems described herein may classify, using classification models, unclassified domain names as malicious domain names, based on the respective features of the unclassified domain names. The systems described herein may perform step 314 in a variety of ways. For example, classifying module 116 may, as part of computing device 202, server 206, and/or DNS server 208 in FIG. 2, classify, using classification model 128, unclassified domain name 129 as malicious domain name 131, based on respective features of the unclassified domain name 130.

In some examples, computer-implemented method 300 many include adding malicious domain names to lists of known malicious domain names. For example, malicious domain name 131 may be added to list of known malicious domain names 126.

In some embodiments, computer-implemented method 300 many include sending lists of known malicious domain names to malware detection systems. For example, list of known malicious domain names 126 may be sent from computing device 202, server 206, and/or DNS server 208 to a malware detection system in computing device 202, server 206, and/or DNS server 208. In some examples, malware detection systems may include spam filtering systems and/or secure browsing systems.

In some examples, computer-implemented method 300 many include performing security actions in response to classifying the unclassified domain names as malicious domain names. For example, computing device 202, server 206, and/or DNS server 208 may perform security action 132 in response to classifying unclassified domain name 129 as malicious domain name 131. In some embodiments, security action 132 many include blocking access to and/or by a device and/or IP address associated with the malicious domain name. For example, computing device 202, server 206, and/or DNS server 208 may block access to a device associated with malicious domain name 131. In additional examples, the security actions may include displaying, on user displays, warnings indicating that the sites associated with the malicious domain names are potentially malicious. In some examples, security action 132 may include displaying, on a user display, an indication that unclassified domain name 129 is classified as a malicious domain name 131 and/or that malicious domain name 131 is blocked.

FIG. 4 depicts an example of a user display device 400 including display 404 which may present user interface 406. In this non-limiting example, user display device 400 may a warning, such as display warning message 402, as at least a part of security action 132 in response to identifying unclassified domain name 129 as malicious domain name 131.

As detailed above, the steps outlined in method 300 in FIG. 3 may automatically identify malicious domain names. In some examples, domain names used by attackers may be identified in advance of attacks and/or before attackers stop using the domain names. By doing so, the systems and methods described herein may protect users by beneficially improving functioning of computing devices and/or provide targeted protection against malware, and thus improve fields of malware protection in general, by providing methods for automatically identifying malicious domain names. In some examples, systems and methods described herein may beneficially provide improvements in accuracy of detecting malicious domain names.

Figure 5:
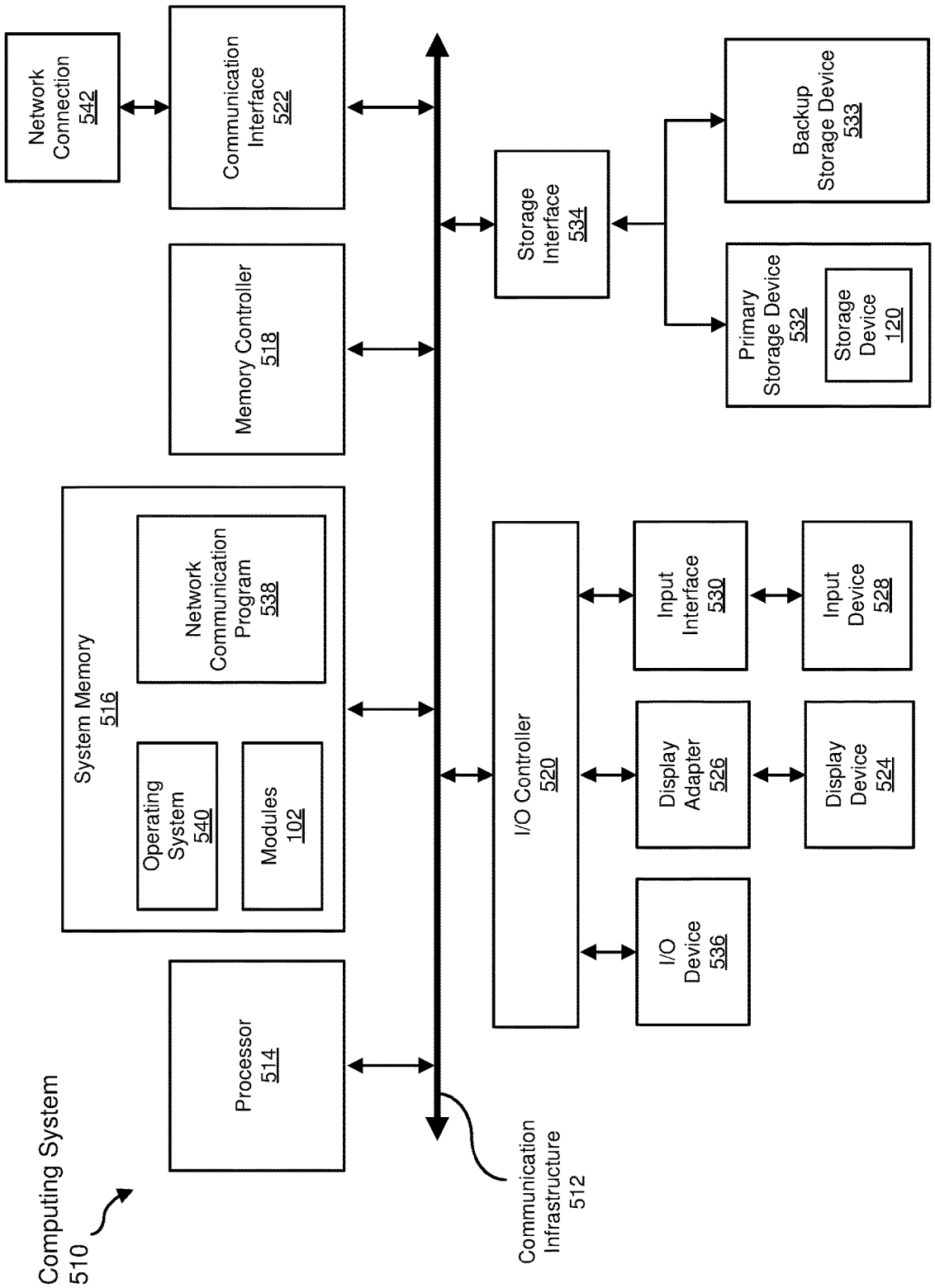
FIG. 5 is a block diagram of an example computing system capable of implementing one or more of the embodiments described and/or illustrated herein.

FIG. 5 is a block diagram of an example computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the example embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In some examples, system memory 516 may store and/or load an operating system 540 for execution by processor 514. In one example, operating system 540 may include and/or represent software that manages computer hardware and software resources and/or provides common services to computer programs and/or applications on computing system 510. Examples of operating system 540 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

As illustrated in FIG. 5, computing system 510 may also include at least one display device 524 coupled to I/O controller 520 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, example computing system 510 may also include at least one input device 528 coupled to I/O controller 520 via an input interface 530. Input device 528 generally represents any type or form of input device capable of providing input, either computer or human generated, to example computing system 510. Examples of input device 528 include, without limitation, a keyboard, a pointing device, a speech recognition device, variations or combinations of one or more of the same, and/or any other input device.

Additionally or alternatively, example computing system 510 may include additional I/O devices. For example, example computing system 510 may include I/O device 536. In this example, I/O device 536 may include and/or represent a user interface that facilitates human interaction with computing system 510. Examples of I/O device 536 include, without limitation, a computer mouse, a keyboard, a monitor, a printer, a modem, a camera, a scanner, a microphone, a touchscreen device, variations or combinations of one or more of the same, and/or any other I/O device.

Communication interface 522 broadly represents any type or form of communication device or adapter capable of facilitating communication between example computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

In some examples, system memory 516 may store and/or load a network communication program 538 for execution by processor 514. In one example, network communication program 538 may include and/or represent software that enables computing system 510 to establish a network connection 542 with another computing system (not illustrated in FIG. 5) and/or communicate with the other computing system by way of communication interface 522. In this example, network communication program 538 may direct the flow of outgoing traffic that is sent to the other computing system via network connection 542. Additionally or alternatively, network communication program 538 may direct the processing of incoming traffic that is received from the other computing system via network connection 542 in connection with processor 514.

Although not illustrated in this way in FIG. 5, network communication program 538 may alternatively be stored and/or loaded in communication interface 522. For example, network communication program 538 may include and/or represent at least a portion of software and/or firmware that is executed by a processor and/or Application Specific Integrated Circuit (ASIC) incorporated in communication interface 522.

As illustrated in FIG. 5, example computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, storage device 120 from FIG. 1 may be at least a portion of primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 510 may be configured as an Application Specific Integrated Circuit (ASIC) adapted to implement one or more of the example embodiments disclosed herein.

Figure 6:
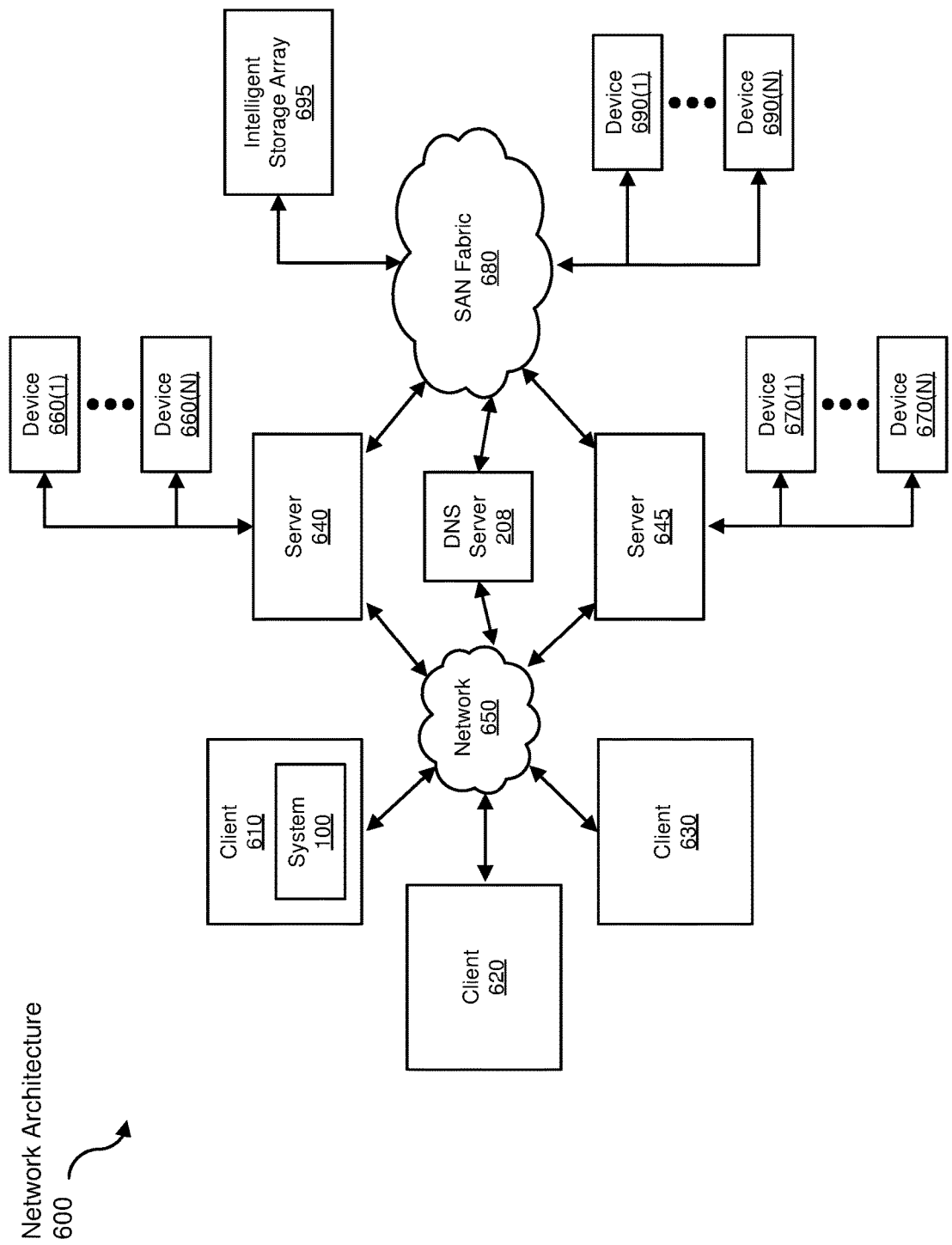
FIG. 6 is a block diagram of an example computing network capable of implementing one or more of the embodiments described and/or illustrated herein.

FIG. 6 is a block diagram of an example network architecture 600 in which client system 610, client system 620, client system 630, server 640, server 645, and/or DNS server 208 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as example computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to example computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the example embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an example method for identifying malicious domain names from a passive domain name system server log.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive passive domain name system server log information to be transformed, transform the passive domain name system server log information, output a result of the transformation to a malware detection system, use the result of the transformation to trigger a security action, and store the result of the transformation to a list of known malicious domain names. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for identifying malicious domain names from a passive domain name system server log, at least a portion of the method being performed by a computing device comprising at least one processor, the method comprising:
    creating, at the computing device, a pool of domain names at least in part from the passive domain name system server log, wherein the passive domain name system server log is received from a domain name server;
    identifying respective features of each domain name in the pool of domain names, wherein at least one of the respective features of each domain name in the pool of domain names describes a domain name server query access pattern of a user;
    preparing a list of known benign domain names and the respective features of each known benign domain name on the list of known benign domain names, wherein the known benign domain names are in the pool of domain names;
    preparing a list of known malicious domain names and the respective features of each known malicious domain name on the list of known malicious domain names, wherein the known malicious domain names are in the pool of domain names;
    computing a classification model based at least in part on:
        the respective features of each known benign domain name on the list of known benign domain names, and
        the respective features of each known malicious domain name on the list of known malicious domain names;
    identifying respective features of an unclassified domain name; and
    classifying, using the classification model, the unclassified domain name as a malicious domain name, based on the respective features of the unclassified domain name.

2. The method of claim 1, wherein each domain name in the pool of domain names is a fully-qualified domain name.

3. The method of claim 1, wherein identifying respective features of each domain name in the pool of domain names further comprises at least one of:
    identifying a number of days since the domain name was initially present in the passive domain name server log;
    identifying a number of days since the domain name was recently present in the passive domain name server log; and
    identifying an age of the domain name.

4. The method of claim 1, wherein identifying respective features of each domain name in the pool of domain names further comprises at least one of:
    identifying a total number of queries for the domain name;
    identifying a standard deviation of the total number of queries for the domain name;
    identifying an average number of queries per day for the domain name; and
    identifying a standard deviation of the average number of queries per day for the domain name.

5. The method of claim 1, wherein identifying respective features of each domain name in the pool of domain names further comprises at least one of:
    identifying a score describing the domain name is automatically generated; and
    identifying a number of fully-qualified domain names of a main domain associated with the domain name.

6. The method of claim 1, wherein identifying respective features of each domain name in the pool of domain names further comprises at least one of:
    identifying a total number of internet protocol (IP) addresses mapped to the domain name;
    identifying an average number of IP addresses mapped to the domain name per day;
    identifying a rate at which new IP addresses are mapped to the domain name;
    identifying a rate at which new countries are associated with the domain name;
    identifying a rate at which new IP prefixes are mapped to the domain name;
    identifying a rate at which new organizations are associated with the domain name;
    identifying an average lifetime of IP addresses mapped to the domain name;
    identifying a total number of countries associated with IP addresses mapped to the domain name;
    identifying a most recent time a new country was associated with IP addresses mapped to the domain name;
    identifying a total number of IP prefixes to which IP addresses mapped to the domain name belong;
    identifying a total number of organizations to which IP addresses mapped to the domain name belong;
    identifying a ratio of IP addresses mapped to the domain name that are benign versus IP addresses mapped to the domain name that are known to have a connection to a malicious entity; and
    identifying a number of other domain names that share an IP address with the domain name.

7. The method of claim 1, wherein identifying respective features of each domain name in the pool of domain names further comprises at least one of:
    identifying a total number of internet protocol (IP) addresses that query the domain name;
    identifying an average number of clients of the domain name per day;
    identifying an average number of clients of the domain name per month;
    identifying a rate at which new clients of the domain name query the domain name;
    identifying a rate at which new countries, to which querying clients of the domain name belong, are present; and
    identifying a rate at which new IP prefixes are present for clients querying the domain name.

8. The method of claim 1, wherein identifying respective features of each domain name in the pool of domain names further comprises at least one of:
- identifying a number of distinct canonical names associated with the domain name;
- identifying a rate at which new canonical names associated with the domain name are added; and
- identifying an average age of canonical names associated with the domain name.

9. The method of claim 1, wherein identifying respective features of each domain name in the pool of domain names further comprises at least one of:
- identifying a total number of name servers serving the domain name;
- identifying a rate at which new name servers serving the domain name are added; and
- identifying an average age of a name server serving the domain name.

10. The method of claim 1, wherein identifying respective features of each domain name in the pool of domain names further comprises at least one of:
- identifying a number of other domain names registered by an entity that registered the domain name; and
- identifying a number of other domain names registered at the same time as the domain name.

11. The method of claim 1, further comprising performing a security action in response to classifying the unclassified domain name as a malicious domain name.

12. The method of claim 11, wherein the security action further comprises blocking access to a device associated with the malicious domain name.

13. The method of claim 1, further comprising:
adding the malicious domain name to the list of known malicious domain names.

14. The method of claim 1, further comprising:
sending the list of known malicious domain names to a malware detection system.

15. A system for identifying malicious domain names from a passive domain name system server log, the system comprising:
- at least one physical processor;
- physical memory comprising computer-executable instructions that, when executed by the physical processor, cause the physical processor to:
  - create a pool of domain names at least in part from the passive domain name system server log, wherein the passive domain name system server log is received from a domain name server;
  - identify respective features of each domain name in the pool of domain names, wherein at least one of the respective features of each domain name in the pool of domain names describes a domain name server query access pattern of a user;
  - prepare a list of known benign domain names and the respective features of each known benign domain name on the list of known benign domain names, wherein the known benign domain names are in the pool of domain names;
  - prepare a list of known malicious domain names and the respective features of each known malicious domain name on the list of known malicious domain names, wherein the known malicious domain names are in the pool of domain names;
  - compute a classification model based at least in part on:
    - the respective features of each known benign domain name on the list of known benign domain names, and
    - the respective features of each known malicious domain name on the list of known malicious domain names;
  - identify respective features of an unclassified domain name; and
  - classify, using the classification model, the unclassified domain name as a malicious domain name, based on the respective features of the unclassified domain name.

16. The system of claim 15, wherein each domain name in the pool of domain names is a fully-qualified domain name.

17. A non-transitory computer-readable medium comprising one or more computer-executable instructions that, when executed by at least one processor of a computing device, cause the computing device to:
- create a pool of domain names at least in part from a passive domain name system server log, wherein the passive domain name system server log is received from a domain name server;
- identify respective features of each domain name in the pool of domain names wherein at least one of the respective features of each domain name in the pool of domain names describes a domain name server query access pattern of a user;
- prepare a list of known benign domain names and the respective features of each known benign domain name on the list of known benign domain names, wherein the known benign domain names are in the pool of domain names;
- prepare a list of known malicious domain names and the respective features of each known malicious domain name on the list of known malicious domain names, wherein the known malicious domain names are in the pool of domain names;
- compute a classification model based at least in part on:
  - the respective features of each known benign domain name on the list of known benign domain names, and
  - the respective features of each known malicious domain name on the list of known malicious domain names;
- identify respective features of an unclassified domain name; and
- classify, using the classification model, the unclassified domain name as a malicious domain name, based on the respective features of the unclassified domain name.

* * * * *